(12) United States Patent
Wei

(10) Patent No.: US 12,507,331 B2
(45) Date of Patent: Dec. 23, 2025

(54) DRIVE CIRCUIT FOR SWITCHING COLOR TEMPERATURE AND BRIGHTNESS WITH TOGGLE SWITCH AND LED LAMP THEREOF

(71) Applicant: Junmin Wei, Shenzhen (CN)

(72) Inventor: Junmin Wei, Shenzhen (CN)

( * ) Notice: Subject to any disclaimer, the term of this patent is extended or adjusted under 35 U.S.C. 154(b) by 106 days.

(21) Appl. No.: 18/602,750

(22) Filed: Mar. 12, 2024

(65) Prior Publication Data
US 2025/0240855 A1    Jul. 24, 2025

(30) Foreign Application Priority Data

Jan. 18, 2024   (CN) .......................... 202420128607.7

(51) Int. Cl.
H05B 45/20   (2020.01)
H05B 45/10   (2020.01)

(52) U.S. Cl.
CPC ............ *H05B 45/20* (2020.01); *H05B 45/10* (2020.01)

(58) Field of Classification Search
CPC ................................. H05B 45/20; H05B 45/10
See application file for complete search history.

(56) References Cited

U.S. PATENT DOCUMENTS

| | | | | |
|---|---|---|---|---|
| 6,366,270 B1 * | 4/2002 | Evanicky | ............. | G09G 3/3413 345/589 |
| 9,492,576 B1 * | 11/2016 | Cudak | ........................ | A61L 2/10 |
| 2019/0150246 A1 * | 5/2019 | Yadav | .................... | H05B 47/10 315/297 |
| 2021/0267039 A1 * | 8/2021 | Chung | ................. | H05B 47/185 |

* cited by examiner

*Primary Examiner* — Minh Tran
*Assistant Examiner* — Minh D A
(74) *Attorney, Agent, or Firm* — JEEN IP LAW, LLC

(57) ABSTRACT

A drive circuit for switching color temperature and brightness with a toggle switch and an LED lighting fixture are provided. The drive circuit includes an LED light group, a power supply unit, a dimming unit, and a color temperature adjustment unit. The LED lighting fixture includes a housing, a lamp housing that is adhered to the housing, and a PCB board that integrates a light source group and a drive power supply. The power and color temperature are adjusted through a toggle switch, an operation is simple, thereby facilitating a user to use different powers for lighting and selecting an appropriate color temperature in different spaces to enhance the user experience and visual comfort.

6 Claims, 13 Drawing Sheets

DRIVE CIRCUIT FOR SWITCHING COLOR TEMPERATURE AND BRIGHTNESS WITH TOGGLE SWITCH AND LED LAMP THEREOF

CROSS-REFERENCE TO RELATED APPLICATIONS

This application claims priority to Chinese Patent Application No. 202420128607.7, filed on Jan. 28, 2024, which is hereby incorporated by reference in its entirety.

TECHNICAL FIELD

The present disclosure relates to the field of lamps and lanterns technologies, and in particular, to a derive circuit for switching color temperature and brightness with a toggle switch and an LED Lamp.

BACKGROUND

In the modern lighting industry, LED lighting fixtures have gradually become mainstream. The diversity and customization requirements of LED lighting fixtures pose great challenges to power supply design. Traditional LED lighting power supplies are often designed and produced only for specific lighting parameters, which not only increases production costs but also puts great pressure on inventory management. There are various LED lighting fixtures available on the market that are compatible with different specifications and can match various power and color temperature requirements with drive circuits.

A LED power supply (CN219514256U, published on Aug. 11, 2023) for adjusting power and color temperature with a toggle, which includes a rectification circuit, a front stage of the rectification circuit is equipped with an EMC circuit for anti-interference, a back stage of the rectification circuit is equipped with a boost circuit, the boost circuit is connected with a control circuit for adjusting power, a back stage of the boost circuit is equipped with a step-down circuit, a back stage of the step-down circuit is equipped with an output circuit. The control circuit is connected to a toggle power adjustment circuit, the output circuit is connected to a toggle color temperature adjustment circuit used to adjust the LED color temperature. The control circuit includes a PFC controller, which is controlled by a switch of a PFC controller. A current detection end of the PFC controller is connected to the toggle power adjustment circuit.

This technology adjusts power and color temperature with the toggle, flexibly matching different lighting fixtures, reducing inventory pressure and production costs. However, this technology does not consider an intelligent opening and closing of LED lighting fixtures in different usage states during the day and night. Specifically, when LED lights turn off on their own in areas with high brightness, it avoids energy waste and does not require manual operation, rendering it more intelligent.

SUMMARY

In response to the technical defects in the background technology, the present disclosure proposes a drive circuit and LED lamp for switching color temperature and brightness with a toggle switch, which solves the above technical problems and meets practical needs. The specific technical scheme is as follows:

A drive circuit for switching color temperature and brightness with a toggle switch, which includes: an LED light group, a power supply unit, a dimming unit, and a color temperature adjustment unit; the power supply unit includes a rectification circuit, a first power supply circuit, and a second power supply circuit that are electrically connected sequentially along a current output direction; an output ends of the first power supply circuit and the second power supply circuit are electrically connected to the dimming unit, respectively; the output end of the second power supply circuit is electrically connected to the color temperature adjustment unit, an output end of the rectification circuit is electrically connected to a positive electrode of the LED light group;

the dimming unit includes a toggle power adjustment circuit, an LED drive circuit, an optical control circuit, and a dimming interface conversion circuit; the toggle power adjustment circuit is provided with a power adjustment toggle switch SW1, a transistor Q14, and a transistor Q15; the output end of the second power supply circuit is electrically connected to the power adjustment toggle switch SW1; output ends of the power adjustment toggle switch SW1 and the second power supply circuit are electrically connected to a gate of the transistor Q14 and a gate of the transistor Q15, respectively; the LED drive circuit includes a microcontroller U1, a microcontroller U2, a switch tube Q1, and a switch tube Q12; a drains of the switch tube Q1 and the switch tube Q2 are electrically connected to a negative electrode of the entire LED light group, a gate of the switch tube Q1 is electrically connected to the microcontroller U1, a source electrode of the switch tube Q1 is electrically connected to a drain of a transistor Q15, a gate of the switch tube Q2 is electrically connected to the microcontroller U2, a source electrode of the switch tube Q2 is electrically connected to a drain of the transistor Q14, an output end of the rectification circuit is electrically connected to the microcontroller U1 and the microcontroller U2; the optical control circuit includes a microcontroller U5, a switch tube Q13, and a switch tube Q7; the microcontroller U5 is electrically connected to a gate of the switch tube Q13; the output end of the second power supply circuit is electrically connected to a drain of the switch tube Q13 and a gate of the switch tube Q7; the dimming interface conversion circuit includes a dimmer and a microcontroller U4; the output end of the first power supply circuit is electrically connected to the microcontroller U4, the microcontroller U4 is electrically connected a drain of the switch tube Q7 and a positive electrode of the dimmer; a PWM output end of the microcontroller U4 is electrically connected to the microcontroller U1 and the microcontroller U2;

the color temperature adjustment unit includes a color temperature toggle switch SW2 and two sets of toggle color temperature adjustment circuits that are parallelly connected.

In an embodiment of the present disclosure, the two sets of toggle color temperature adjustment circuits are a first toggle color temperature adjustment circuit and a second toggle color temperature adjustment circuit, respectively; the first toggle color temperature adjustment circuit includes a switch tube Q11, a switch tube Q5, and a switch tube Q3, the second toggle color temperature adjustment circuit includes the switch tube Q12, a switch tube Q6, and a switch tube Q4, the output end of the second power supply circuit is electrically connected to a source electrode of the switch tube Q11 and a source electrode of the switch tube Q12, K1 end of the color temperature toggle switch SW2 is electrically connected to a gate of the switch tube Q11 and a source electrode of the switch tube Q12, a drain of the switch tube Q11 is electrically connected to a gate of the switch tube Q5, a positive electrode of the LED light group is electrically connected to a drain of the switch tube Q5 and a gate of the switch tube Q3, K2 end of the color temperature toggle switch SW2 is electrically connected to a gate of the switch tube Q12 and a source electrode of the switch tube Q11; a drain of the switch tube Q12 is electrically connected to a gate of the switch tube Q6; a positive electrode of the LED light group (1) is electrically connected to a drain of the switch tube Q4.

In an embodiment of the present disclosure, the LED light group includes a light group W and a light group C that are parallelly connected, a positive electrode of the light group W and a positive electrode of the light group C are electrically connected to the output end of the rectifier circuit, a negative electrode of the light group W is electrically connected to a drain of the switch tube Q3, a negative electrode of the light group C is electrically connected to a drain of the switch tube Q4, a source electrode of the switch tube Q3 is connected to a drain of the switch tube Q1, a source electrode of the switch tube Q4 is connected to a drain of the switch tube Q2.

In an embodiment of the present disclosure, the first power supply circuit includes a microcontroller U3, an output end of the rectification circuit is electrically connected to the microcontroller U3, the microcontroller U3 outputs a 12V output voltage, the 12V output voltage supplies power to the microcontroller U4.

In an embodiment of the present disclosure, the second power supply circuit includes a filtering capacitor EC7, a resistor R30, a capacitor C5, and a voltage regulator diode that are paralleling connected; the second power supply circuit converts the 12V output voltage to a 5V output voltage, the 5V output voltage supplies power to the microcontroller U5

In an embodiment of the present disclosure, the rectification circuit includes a rectification bridge and a filtering capacitor, the rectification bridge is electrically connected to the filtering capacitor.

A LED light fixture for switching color temperature and brightness with a toggle switch, which includes a housing, a lamp housing that is adhered to the housing, and a PCB board that integrates a light source group and a drive power supply; an end of the housing is connected to the lamp housing through a hinge, the PCB board is provided in the housing, one side of the housing is provided with a photoelectric sensor, a toggle switch button is provided on the PCB board.

In an embodiment of the present disclosure, the lamp housing can rotate along the hinge, an optical control sensor is electrically connected to the PCB board.

The beneficial effects of the present disclosure are:
the present disclosure adjusts the power and color temperature with a toggle, which is easy to operate and convenient for a user to use different powers for lighting in different spaces. Choosing an appropriate color temperature can improve the user experience and visual comfort. Moreover, the present disclosure has designed an optical control function in the circuit, allowing the LED lights to turn on or off on their own according to the environment, thereby avoiding energy waste and rendering it more intelligent and convenient.

The light regulating unit of the present disclosure includes a toggle power adjustment circuit, an LED drive circuit, an optical control circuit and a dimming interface conversion circuit, the dimming interface conversion circuit can realize a dimming function of 0-10V, and cooperate with the toggle power adjustment circuit to realize a segment type power regulating, that is, to realize the power regulation by adjusting the percentage of the power of each segment in the total power.

The present disclosure integrates a light source group and a drive power supply onto a PCB board, which is located in a lamp housing and a housing. When the PCB board reaches its service life, the lamp housing can be directly opened, the PCB board can be disassembled, and a new PCB board can be replaced without the need for rewiring. The operation is simple, convenient, and fast.

Figure 1:
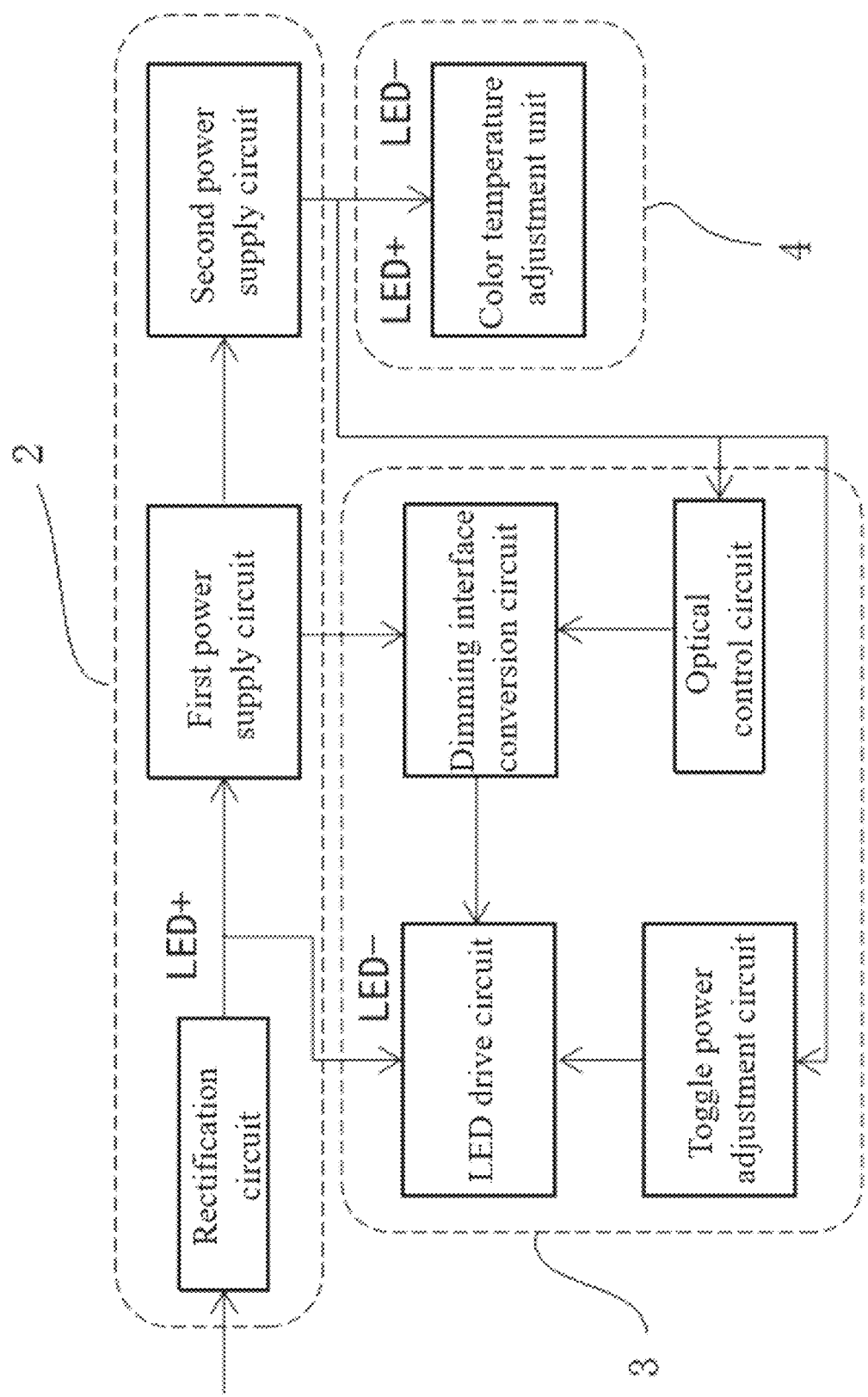
FIG. 1 shows a framework diagram of a drive circuit for switching color temperature and brightness with a toggle switch.

Numeral reference: LED light group 1, power supply unit 2, rectification circuit 21, first power supply circuit 22, second power supply circuit 23, dimming unit 3, toggle power adjustment circuit 31, LED drive circuit 32, optical control circuit 33, dimming interface conversion circuit 34, color temperature adjustment unit 4, housing 5, lamp housing 6, PCB board 7, toggle switch button 8, optical control sensor 9.

DESCRIPTION OF EMBODIMENTS

The following is an explanation of the implementation mode of the present disclosure, combined with FIGS. 1-13 and relevant embodiments. The implementation mode of the present disclosure is not limited to the following embodiments, and the necessary components related to the technical field should be considered as well-known technology in the technical field, which can be known and mastered by those skilled in the art.

Figure 2:
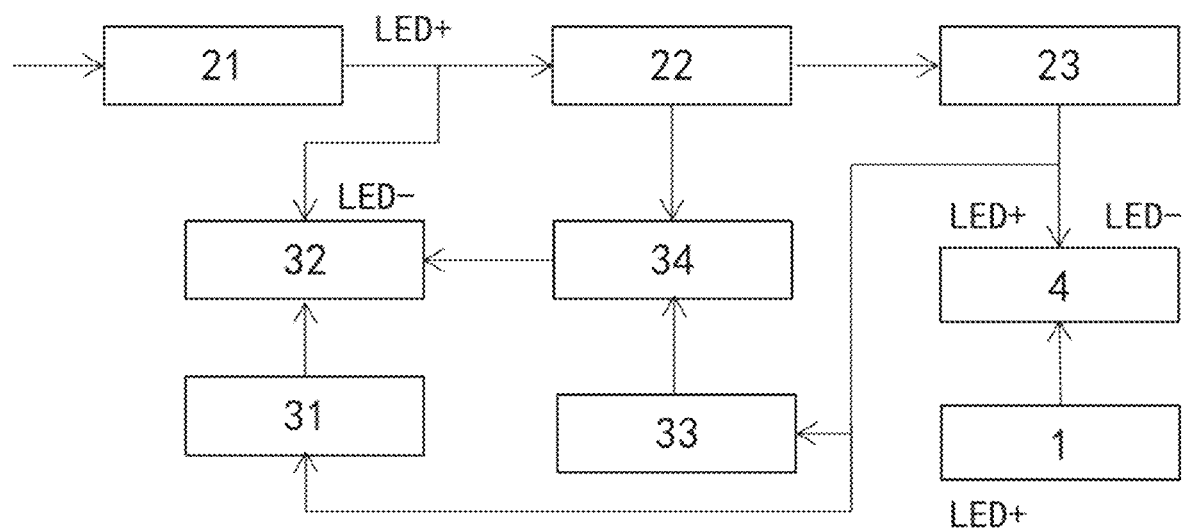
FIG. 2 shows an exemplary block diagram of the drive circuit for switching color temperature and brightness with a toggle switch.

The present disclosure provides a drive circuit for switching color temperature and brightness with a toggle switch, as shown in FIGS. 1 and 2, including: a LED light group 1, a power supply unit 2, a dimming unit 3, and a color temperature adjustment unit 4. The power supply unit 2 includes a rectification circuit 21, a first power supply circuit 22, and a second power supply circuit 23 that are electrically connected in sequence along a current output direction. An output end of the first power supply circuit 22 and an output end of the second power supply circuit 23 are respectively electrically connected to the dimming unit 3, the output end of the second power supply circuit 23 is electrically connected to the color temperature adjustment unit 4, an output end of the rectification circuit 21 is electrically connected to a positive electrode of the LED light group 1.

An electrical connection of the present disclosure is a wire connection.

Figure 5:
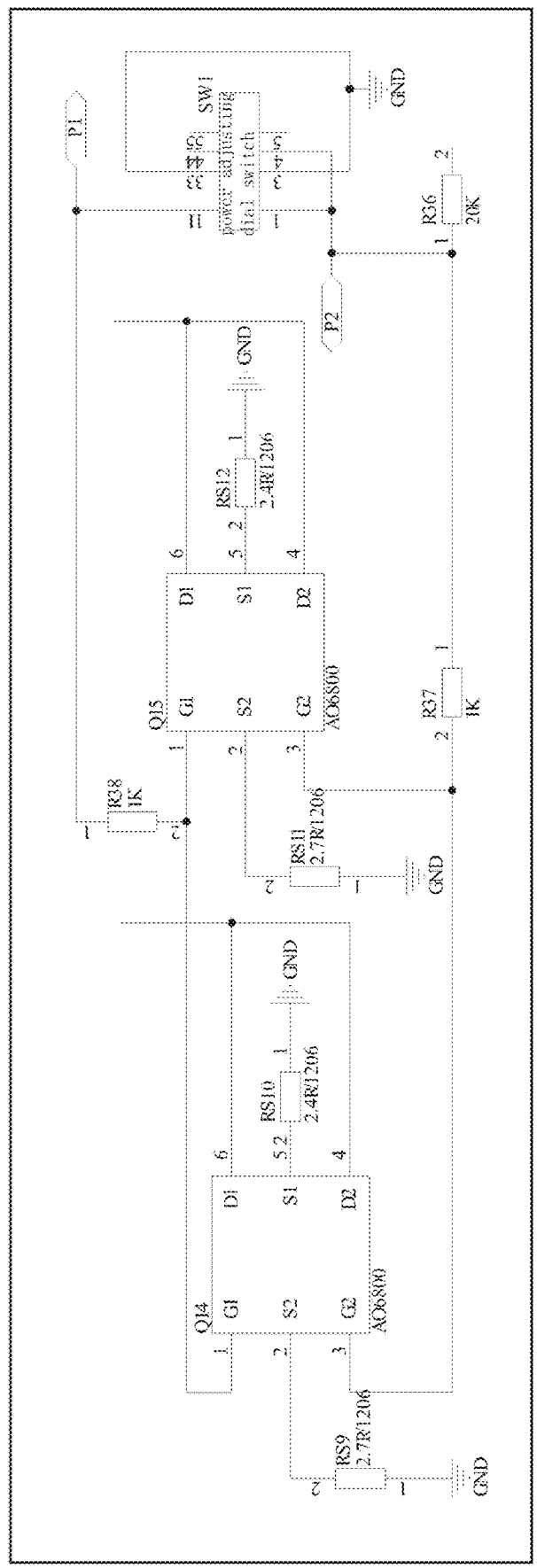
FIG. 5 shows a topology diagram of a toggle power adjustment circuit for switching color temperature and brightness with a toggle switch.

As shown in FIG. 2, the dimming unit 3 includes a toggle power adjustment circuit 31, an LED drive circuit 32, an optical control circuit 33, and a dimming interface conversion circuit 34. As shown in FIG. 5, the toggle power adjustment circuit 31 is equipped with a power adjustment switch SW1, a transistor Q14, and a transistor Q15. An output end of the second power supply circuit 23 is electrically connected to the power adjustment toggle switch SW1. Output ends of the power adjustment toggle switch SW1 and the second power supply circuit 23 are electrically connected to a gate of the transistor Q14 and a gate of the transistor Q15, respectively. The color temperature adjustment unit 4 includes a color adjustment temperature toggle switch SW2 and two sets of color adjustment circuits that are parallelly connected.

The present disclosure adjusts the power and color temperature with a toggle, which is easy to operate and convenient for a user to use different powers for lighting in different spaces. Choosing an appropriate color temperature can improve the user experience and visual comfort. Moreover, the present disclosure has designed an optical control function in the circuit, allowing the LED lights to turn on or off on their own according to the environment, thereby avoiding energy waste and rendering it more intelligent and convenient.

Figure 10:
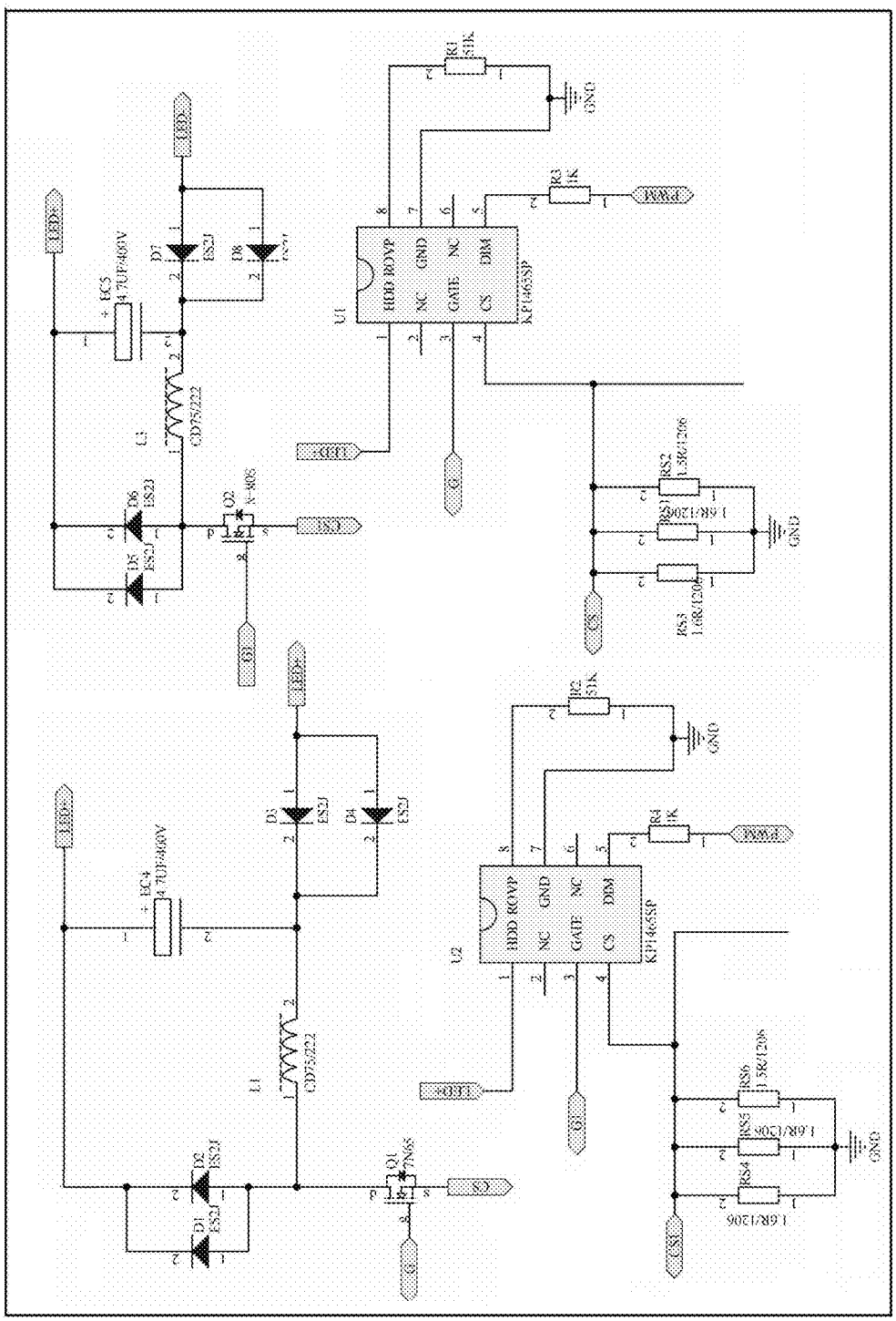
FIG. 10 shows a topology diagram of a toggle power adjustment circuit for switching color temperature and brightness with a toggle switch.

As shown in FIG. 10, the LED drive circuit 32 includes a microcontroller U1, a microcontroller U2, a switch tube Q1, and a switch tube Q12. A drain of the switch tube Q1 is electrically connected to a negative electrode of the entire LED light group 1 with a drain of the switch tube Q2. A gate of the switch tube Q1 is electrically connected to a drain of a transistor Q15, a gate of the switch tube Q2 is electrically connected to a drain of the transistor U2, a source electrode of the switch tube Q2 is electrically connected to a drain of the transistor Q14. An output end of the rectification circuit 21 is electrically connected to the microcontroller U1 and microcontroller U2.

Figure 6:
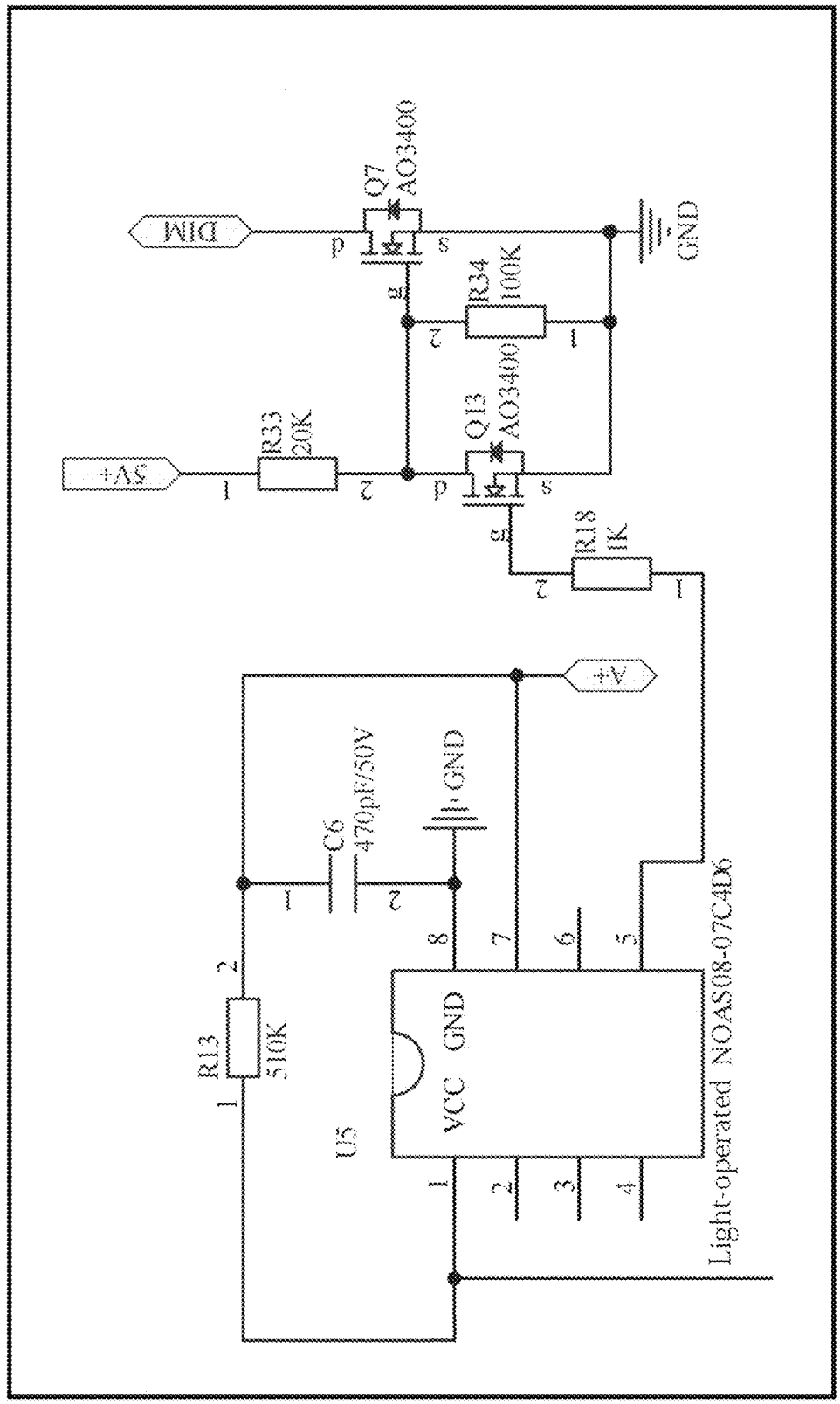
FIG. 6 shows a topology diagram of an optical control circuit for switching color temperature and brightness with a toggle switch.
Figure 7:
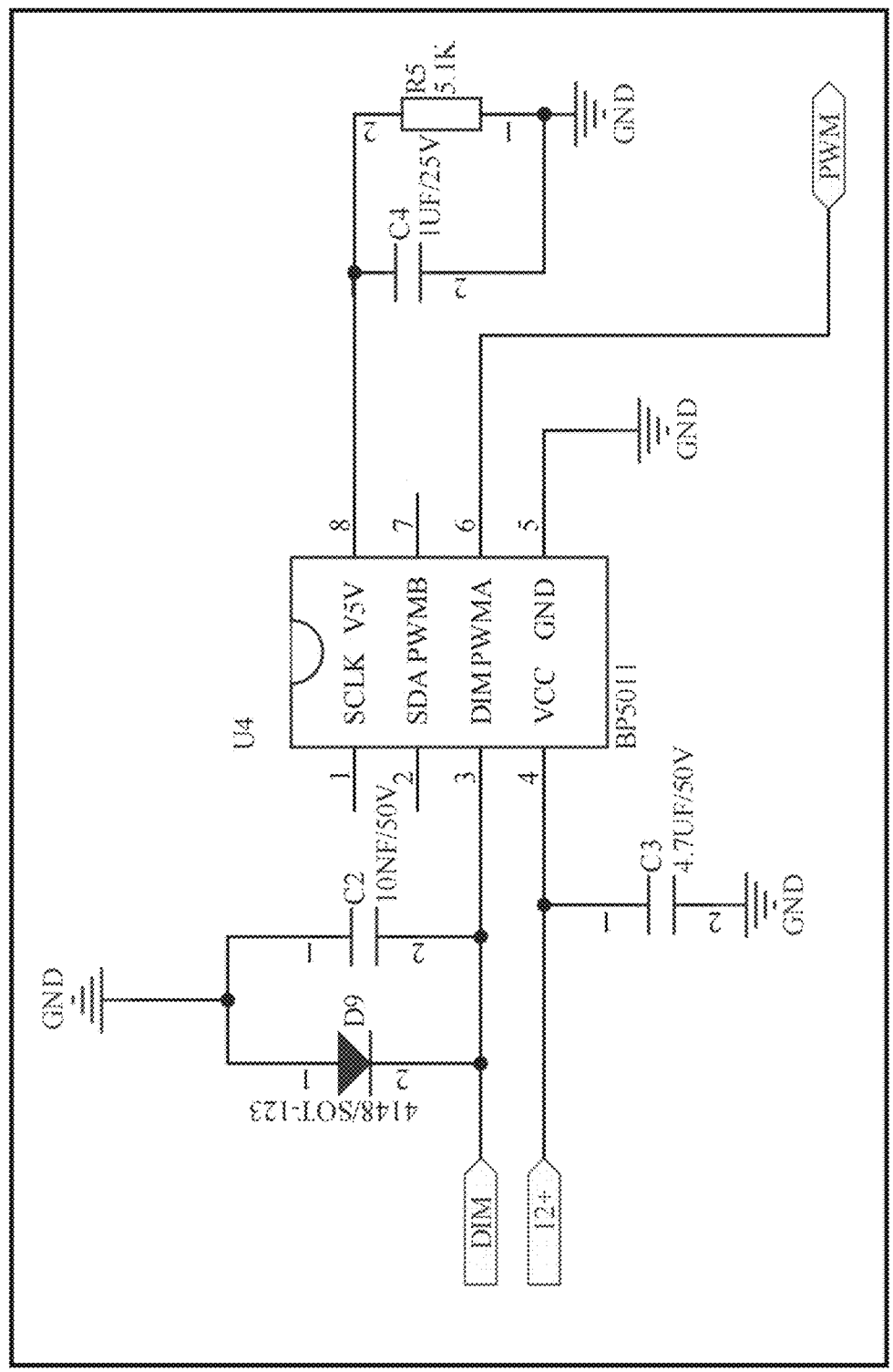
FIG. 7 shows a topology diagram of a dimming interface conversion circuit for switching color temperature and brightness with a toggle switch.

As shown in FIG. 6, the optical control circuit 33 includes a microcontroller U5, a switch tube Q13, and a switch tube Q7. The microcontroller U5 is electrically connected to a gate of the switch tube Q13, an output end of the second power supply circuit 23 is electrically connected to a drain of the switch tube Q13 and a gate of the switch tube Q7. As shown in FIG. 7, the dimming interface conversion circuit 34 includes a dimmer and a microcontroller U4. The output end of the first power supply circuit 22 is electrically connected to the microcontroller U4, the microcontroller U4 is electrically connected to a drain of the switch Q7 and a positive electrode of the dimmer. A PWM output end of the microcontroller U4 is electrically connected to the microcontroller U1 and the microcontroller U2

The dimming unit 3 of the present disclosure includes a toggle power adjustment circuit 31, an LED drive circuit 32, an optical control circuit 33 and a dimming interface conversion circuit 34, the dimming interface conversion circuit 34 can realize a light adjusting function of 0-10V, cooperate with the toggle power adjustment circuit 31 to realize a segment type adjusting power, that is, the power can be adjusted by adjusting a percentage of the power of each segment in the total power.

Transistors Q14 and Q15 are dual N-channel MOSFETs, which are composed of N1 and N2 MOSFETs, as shown in FIG. 5. Position 1-3 of the power adjustment toggle switch SW1 are grounded at P1 and P2 ends; positions 3-4 are grounded at the P2 end. N1 gate of the transistor Q14 is connected to the N1 gate of the transistor Q15 at the P1 end, N2 gate of the transistor Q14 is connected to the N2 gate of the transistor Q15 at the P2 end.

As shown in FIG. 10, a working principle of the dimming unit 3:1) adjusting power: the power adjustment toggle unit 3 is connected to the microcontroller U1 and U2 through transistor Q14 and transistor Q15. A DIM end of the microcontroller U5 is connected to a positive electrode of the dimmer to achieve dimming function of 0-10V. The PWM output end of the microcontroller U5 controls the microcontroller U1 and U2, the microcontroller U1 and U2 respectively control a conduction and cutoff of the switch tube Q1 and control a brightness of the switch tube Q2, determined by the duty cycle. And the source electrode of the switch tube Q1 and switch tube Q2 are grounded through parallel resistors, a total power of the circuit is divided into five sections.

When the power adjustment toggle switch SW1 is turned to position 1-3, P1 and P2 ends are grounded, transistors Q14 and Q15 are not conducting. At this time, three stage power accounts for 60% of the total power. When the power adjustment toggle switch SW1 is turned to positions 3-4, P2 end is grounded, the N2 gate of the transistor Q14 is not conductive to the N2 gate of the transistor Q15. The N1 gate of the transistor Q14 is conductive to N1 gate of the transistor Q15. At this time, four stage power accounts for 80% of the total power. When the power adjustment toggle switch SW1 is turned to position 4-5, both transistor Q14 and transistor Q15 are conducting, and at this time, the four stage power accounts for 100% of the total power.

2) Light control: As shown in FIG. 6, A+ end of the microcontroller U5 is connected to the optical control sensor. When the optical control sensor is transmitted to the microcontroller U5, the microcontroller U5 outputs a high level to a gate of the switch tube Q13. The switch tube Q13 conducts, causing Q7 to conduct, thereby causing a short circuit at a DIM end of the microcontroller U4. The microcontroller U4 outputs a PWM signal to the microcontroller U1 and microcontroller U2, thereby lowering a gate level of the switch tube Q1 and switch tube Q2, and turning off an output of the LED light group 1.

Figure 8:
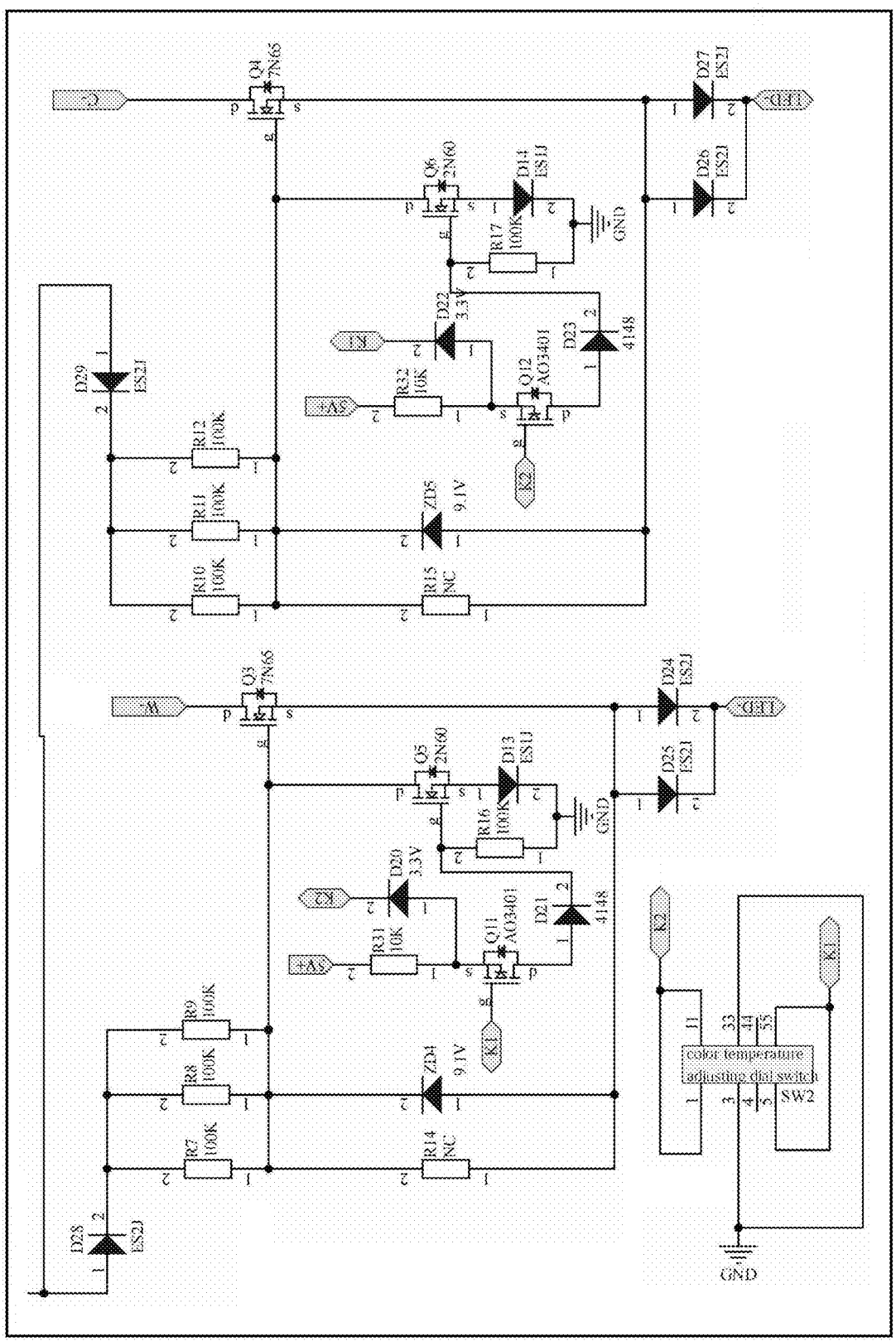
FIG. 8 shows a topology diagram of a color temperature adjustment circuit for switching color temperature and brightness with a toggle switch.

In an implementation mode, as shown in FIG. 8, the two sets of color temperature adjustment circuits are a first color temperature adjustment circuit and a second color temperature adjustment circuit, respectively. As shown in FIG. 7, the first color temperature adjustment circuit includes a switch tube Q11, a switch tube Q5, and a switch tube Q3. The second color temperature adjustment circuit includes a switch tube Q12, a switch tube Q6, and a switch tube Q4. An output end of the second power supply circuit 23 is electrically connected to a source electrode of the switch tube Q11 and switch tube Q12. K1 end of the color temperature adjustment switch SW2 is electrically connected to a gate of the switch tube Q11 and a source electrode of the switch tube Q12. A drain of the switch tube Q11 is connected to a gate of the switch tube Q5, a drain of the LED light group 1 is connected to a gate of the switch tube Q3, K2 end of the color temperature toggle switch SW2 is connected to a gate of the switch tube Q12 and a source electrode of the switch tube Q11, a drain of the switch tube Q12 is connected to a gate of the switch tube Q6, a drain of the LED light group 1 is connected to a gate of the switch tube Q4.

Figure 11:
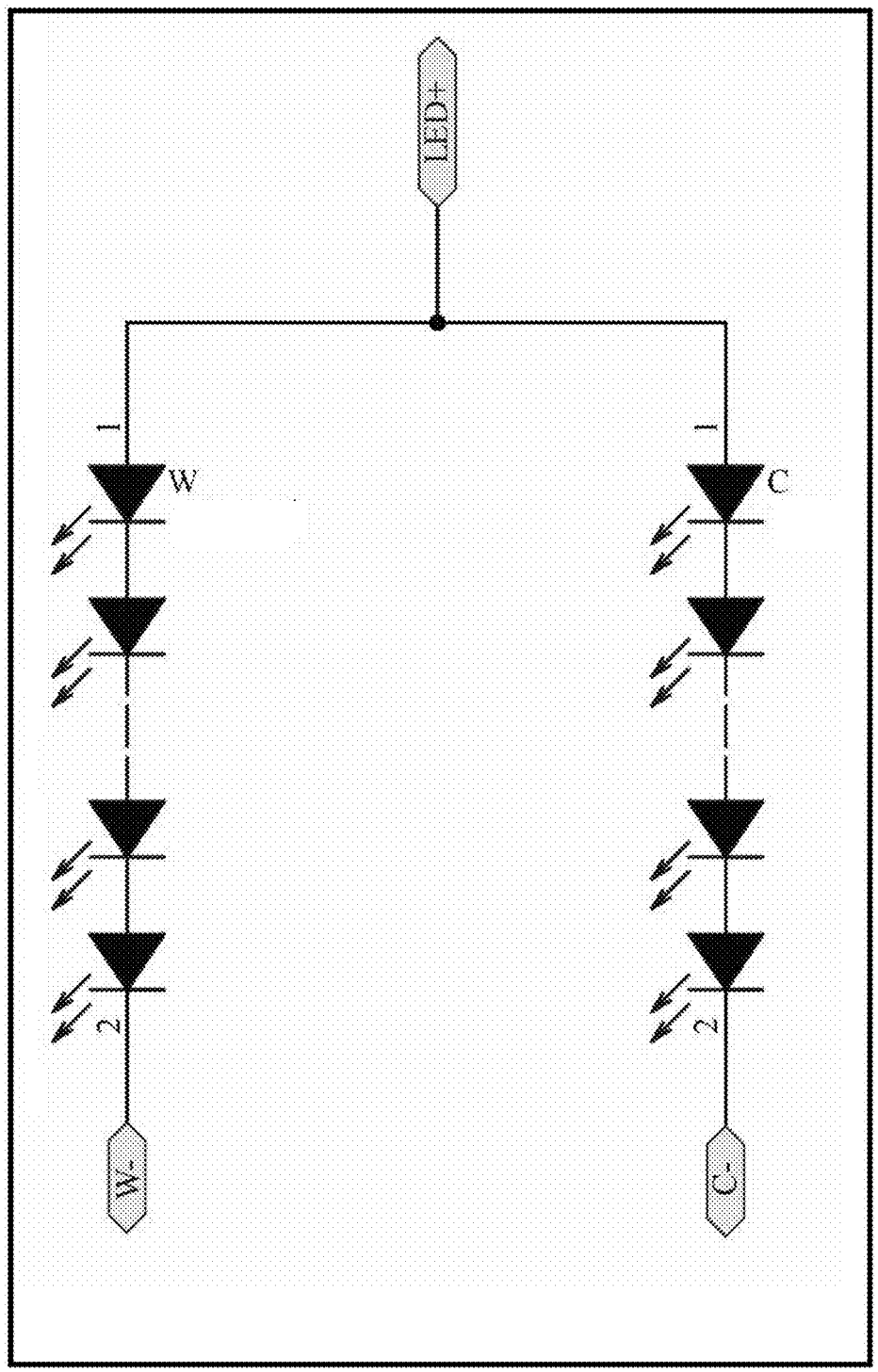
FIG. 11 shows a structure diagram of a LED light group for switching color temperature and brightness with a toggle switch.

As shown in FIG. 11, the LED light group 1 includes a light group W and a light group C that are parallelly connected. A positive electrode of the light group W and a positive electrode of the light group C are respectively electrically connected to the output end of the rectification circuit 21. A negative electrode of the light group W is electrically connected to a drain of the switch tube Q3, a negative electrode of the light group C is electrically connected to a drain of the switch tube Q4, a source electrode of the switch tube Q3 is electrically connected to a drain of the switch tube Q1, a source electrode of the switch tube Q4 is electrically connected to a drain of the switch tube Q2.

As shown in FIG. 8, positions 1-3 of the color temperature toggle switch SW2 are grounded at the K2 end; positions 4-5 are grounded at the K1 end. It is worth noting that in the present disclosure, only the switch tube Q11 and the switch tube Q12 are P-type MOSFETs. The characteristics of this type of MOSFET are that the source electrode is an input end, the drain is an output end, the gate is at a low level, and the MOSFET is conducting. An output voltage of the second power supply circuit 23 is connected to the color temperature toggle switch SW2 through K1 or K2 end.

The working principle of the color temperature adjustment unit 4: a color temperature of the light group W is different from that of the light group C. When the temperature adjustment toggle switch SW2 is turned to positions 1-3, the gate of the switch tube Q12 is grounded through K2 end, and the switch tube Q12 conducts and provides a high level to the switch tube Q6, causing the gate of the switch tube Q4 to pull low, the switch tube Q4 does not conduct, and the light group C does not light up; when positions 3-4 of the temperature adjustment toggle switch SW2 is turned, both the switch tube Q11 and the switch tube Q12 are not conducting, resulting in the switch tube Q5 and switch tube Q6 not conducting. The drain of the switch tube Q3 and the switch tube Q4 are at a high level, both the switch tube Q3 and the switch tube Q4 are conducting. The light group W and light group C light up simultaneously when positions 4-5 of the temperature adjustment toggle switch SW2 is turned on, the gate of the switch tube Q11 is grounded through the K1 end. The switch tube Q11 conducts and provides a high level to the switch tube Q5, causing the gate of the switch tube Q3 to low the level. The switch tube Q3 does not conduct, and the light group W does not light up. The color temperature adjustment unit 4 controls the color temperature of LED lights by controlling the light groups W and C with different color temperatures.

Figure 3:
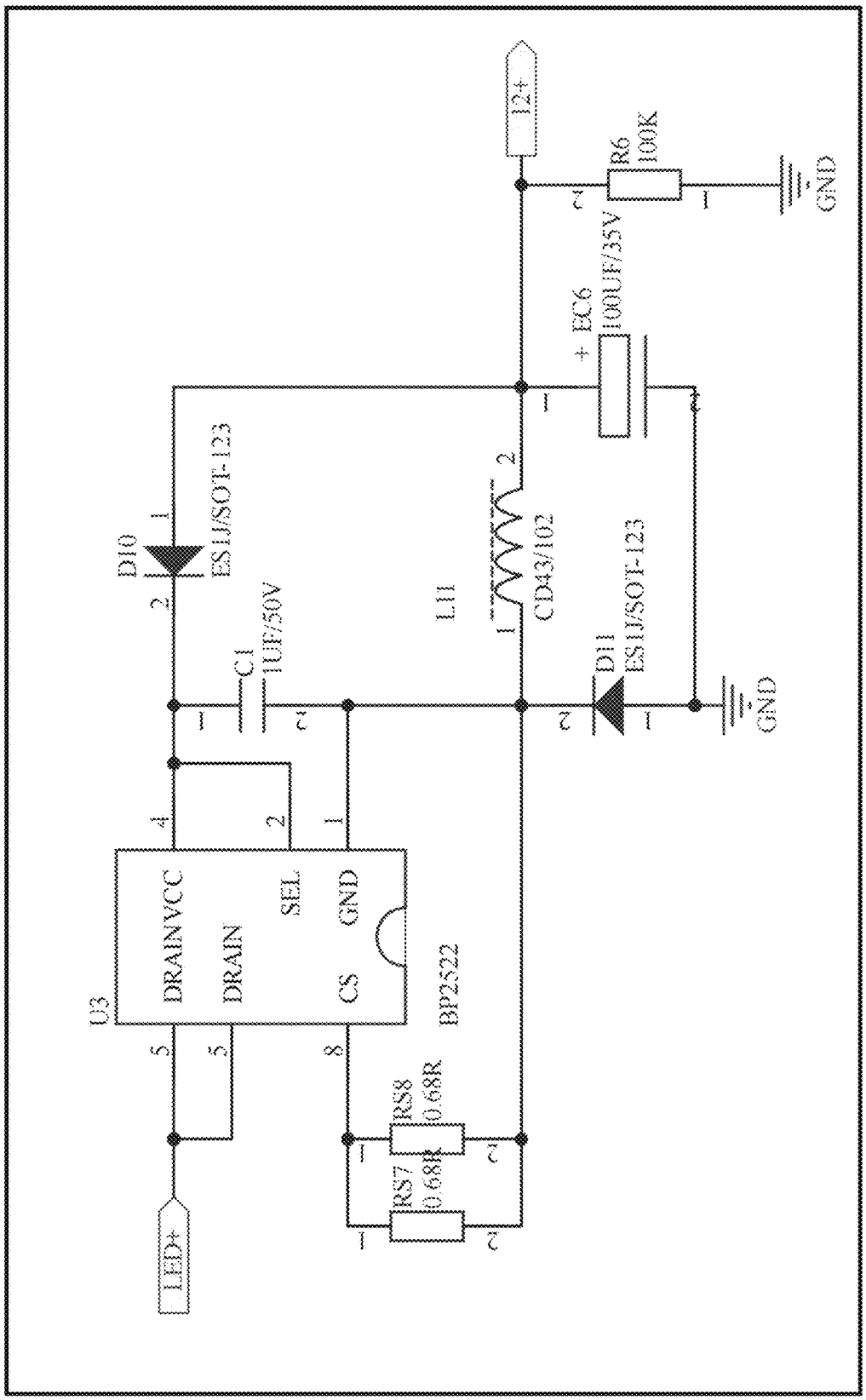
FIG. 3 shows a topology diagram of a first power supply circuit for switching color temperature and brightness with a toggle switch.
Figure 4:
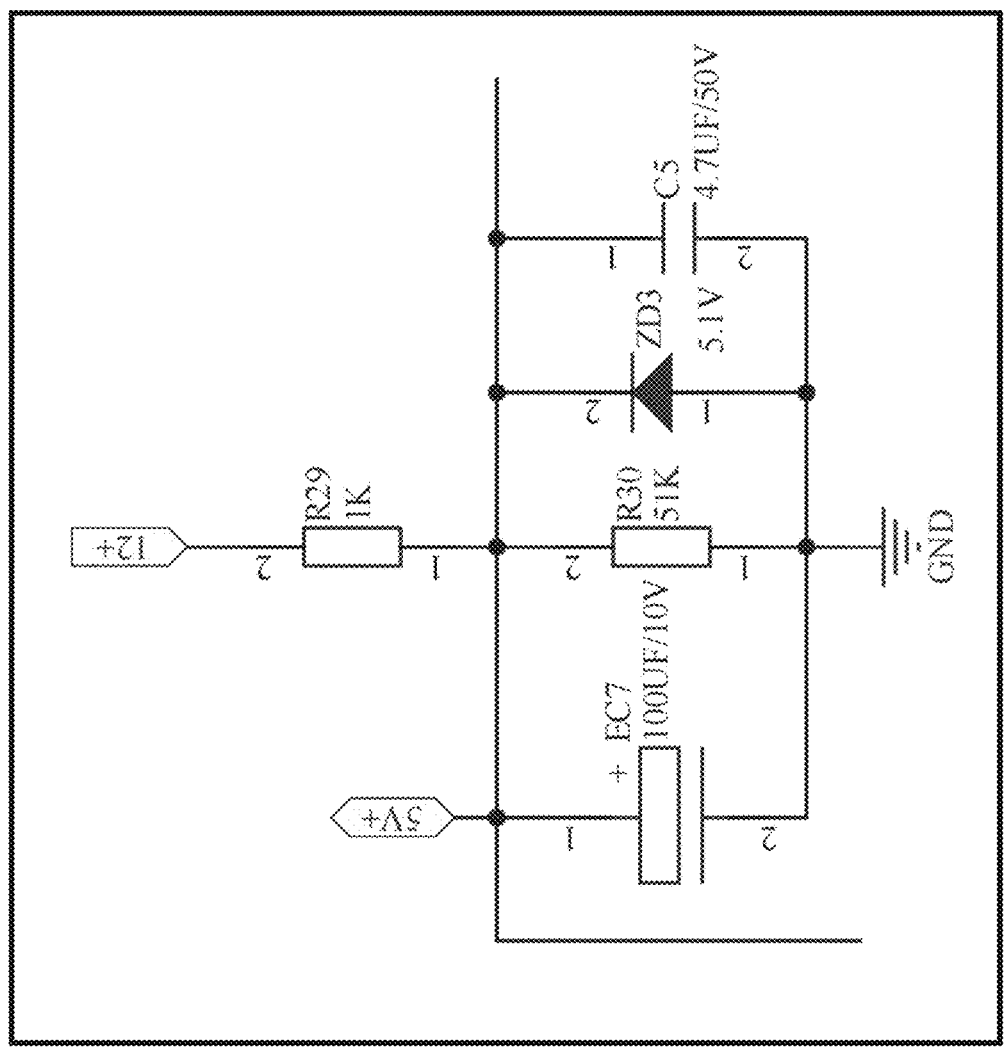
FIG. 4 shows a topology diagram of a second power supply circuit for switching color temperature and brightness with a toggle switch.
Figure 9:
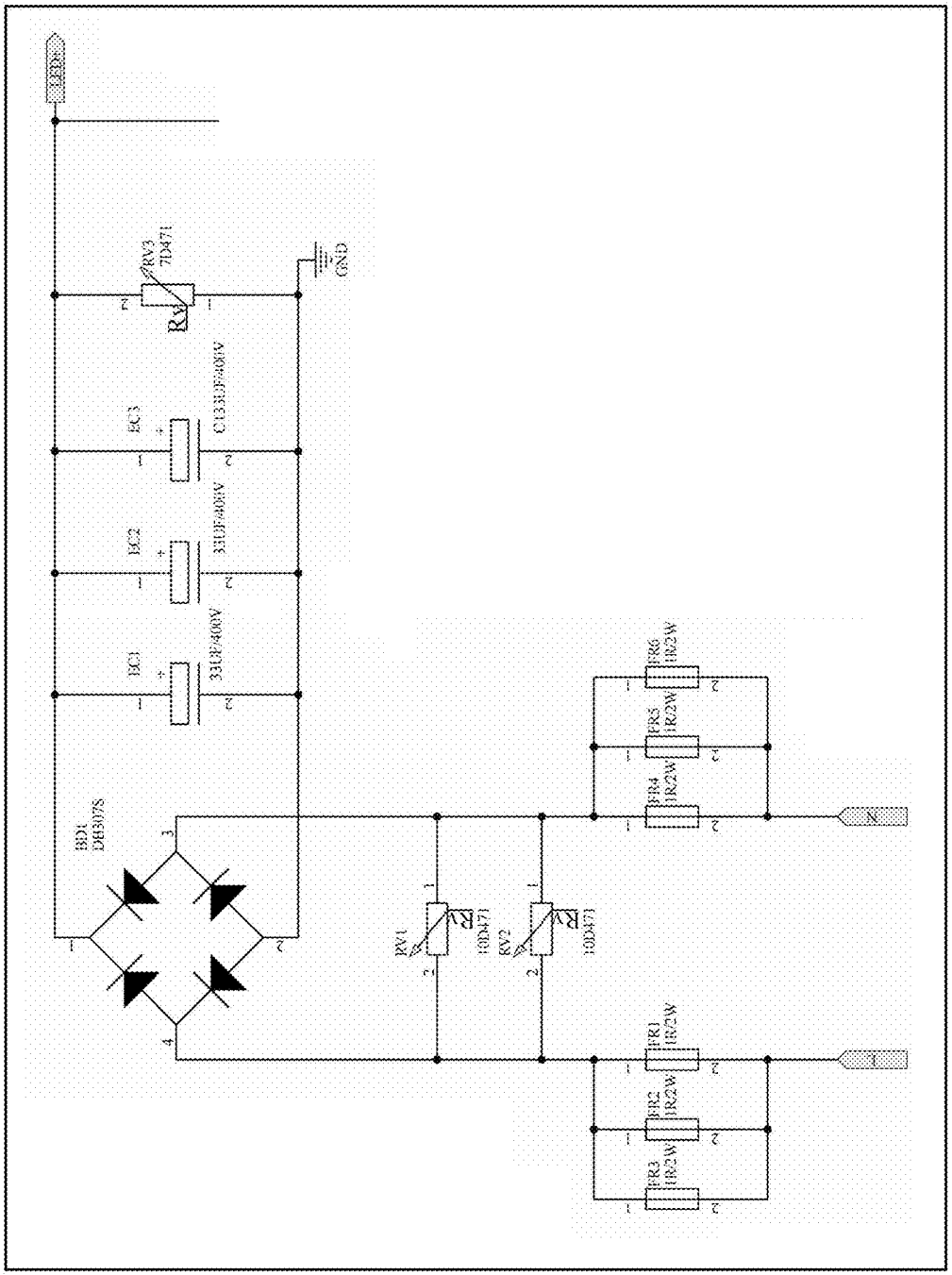
FIG. 9 shows a topology diagram of a LED drive circuit for switching color temperature and brightness with a toggle switch.

In an implementation mode of the present disclosure, as shown in FIG. 9, the rectification circuit 21 includes a rectification bridge and a filtering capacitor, the rectification bridge is electrically connected to the filtering capacitor. As shown in FIG. 3, the first power supply circuit 22 includes a microcontroller U3, an output end of the rectification circuit 21 is electrically connected to the microcontroller U3. The microcontroller U3 outputs a 12V output voltage, which supplies power to the microcontroller U4. As shown in FIG. 4, the second power supply circuit 23 includes a filtering capacitor EC7, a resistor R30, a capacitor C5, and a voltage regulator diode that are parallelly connected. The second power supply circuit 23 converts the 12V output voltage into a 5V output voltage, which supplies power to the microcontroller U5.

The working principle of the power supply unit 2: mains power is rectified by the rectifier bridge of the rectification circuit 21, and then filtered by the filtering capacitor. After rectification and filtering, the mains power can supply power to the LED drive circuit 32 and LED light group 1. Then, the voltage is converted into a 12V output voltage by the microcontroller U3 of the first power supply circuit 22, which supplies power to the microcontroller U4. Finally, the voltage is converted into a 5V output voltage by the second power supply circuit 23, power is supplied to the microcontroller U5, as well as to a drain connected to transistor Q14, transistor Q15, the color temperature adjustment circuit, and switching transistor Q13.

Figure 12:
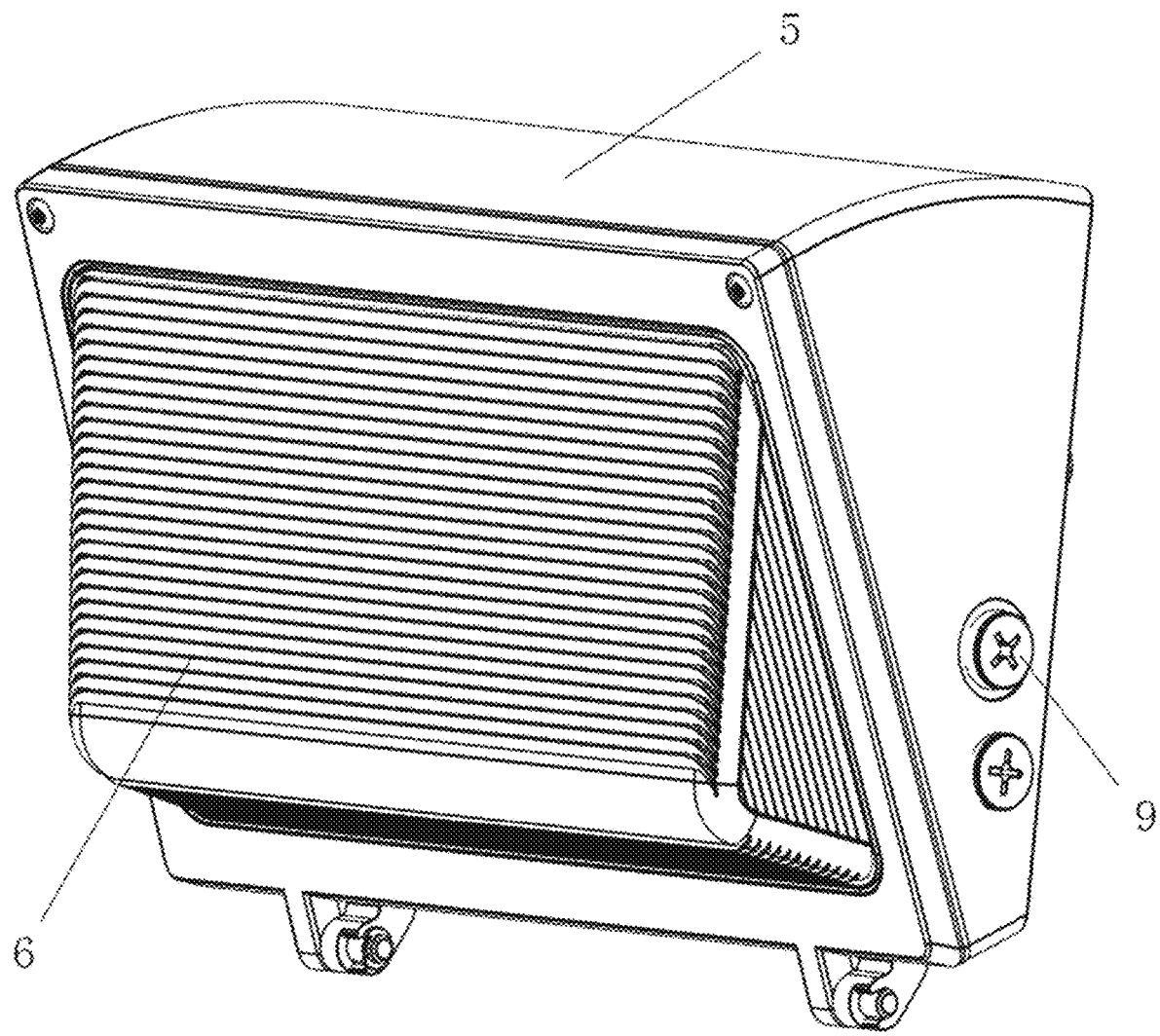
FIG. 12 shows a structure diagram of an LED lighting fixture for switching color temperature and brightness with a toggle switch.
Figure 13:
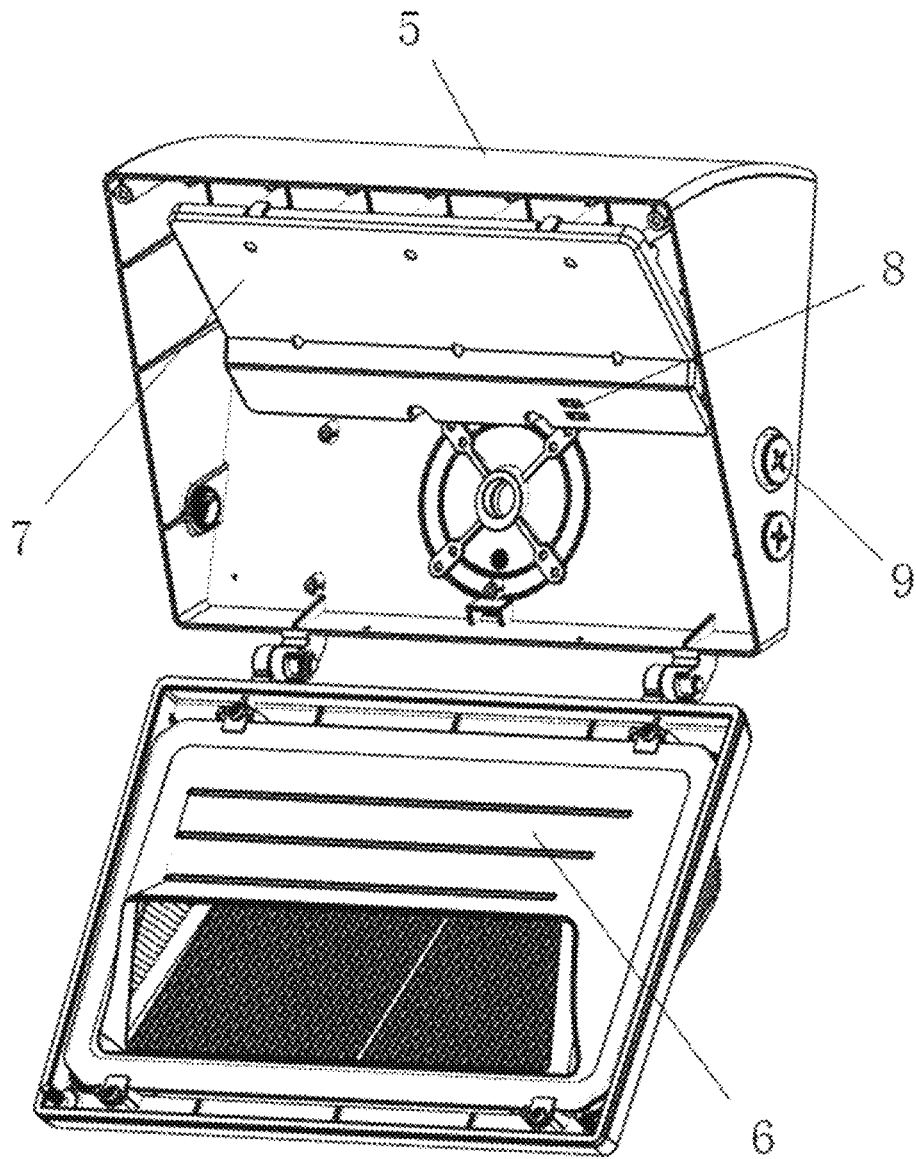
FIG. 13 shows an internal structure of an LED lamp that switches color temperature and brightness with a toggle switch.

The present disclosure provides an LED light fixture for switching color temperature and brightness with a toggle switch, as shown in FIGS. 12 and 13. It includes a housing 5, a lamp housing 6 that is adhered to the housing 5, and a PCB board 7 that integrates a light source group and a drive power supply. One end of the housing 5 is connected to the lamp housing 6 through a hinge, the PCB board 7 is located in the housing 5. An optical control sensor 9 is provided on one side of the housing 5, a toggle switch button 8 is provided on the PCB board 7.

The present disclosure integrates a light source group and a drive power supply onto a PCB board 7, which is located in the lamp housing 6 and the housing 5. When the PCB board 7 reaches its service life, the lamp housing 6 can be directly opened, the PCB board 7 can be disassembled, and a new PCB board 7 can be replaced without the need for rewiring. The operation is simple, convenient, and fast.

In an implementation mode of the present disclosure, the lamp housing 6 can rotate along the hinge. Turning the lamp housing 6 can open an interior of the LED lamp and adjust the toggle switch button 8 to control the brightness and color temperature of the LED lamp. The optical control sensor 9 is electrically connected to the PCB board 7. The optical control sensor 9 is used to sense a brightness of the environment in which the lamp is located, as shown in FIG. 6. The optical control sensor 9 is connected to the A+ end of the microcontroller U5 and transmits the signal to the microcontroller U5.

The above is only a preferred implementation of the present disclosure. It should be noted that for ordinary technical personnel in this field, several improvements and embellishments can be made without departing from the principles of the present disclosure. These improvements and embellishments should also be considered as the protection scope of the present disclosure.

What is claimed is:

1. A drive circuit for switching color temperature and brightness with a toggle switch, comprising: an LED light group, a power supply unit, a dimming unit, and a color temperature adjustment unit;

wherein the power supply unit comprises a rectification circuit, a first power supply circuit, and a second power supply circuit that are electrically connected sequentially along a current output direction; output ends of the first power supply circuit and the second power supply circuit are electrically connected to the dimming unit, respectively; the output end of the second power supply circuit is electrically connected to the color temperature adjustment unit, an output end of the rectification circuit is electrically connected to a positive electrode of the LED light group;

the dimming unit comprises a toggle power adjustment circuit, an LED drive circuit, an optical control circuit, and a dimming interface conversion circuit; the toggle power adjustment circuit is provided with a power adjustment toggle switch SW1, a transistor Q14, and a transistor Q15; the output end of the second power supply circuit is electrically connected to the power adjustment toggle switch SW1; output ends of the power adjustment toggle switch SW1 and the second power supply circuit are electrically connected to a gate electrode of the transistor Q14 and a gate electrode of the transistor Q15, respectively; the LED drive circuit comprises a microcontroller U1, a microcontroller U2, a switch tube Q1, and a switch tube Q12; drain electrodes of the switch tube Q1 and the switch tube Q2 are electrically connected to a negative electrode of the entire LED light group, a gate electrode of the switch tube Q1 is electrically connected to the microcontroller U1, a source electrode of the switch tube Q1 is electrically connected to a drain electrode of a transistor Q15, a gate electrode of the switch tube Q2 is electrically connected to the microcontroller U2, a source electrode of the switch tube Q2 is electrically connected to a drain electrode of the transistor Q14, an output end of the rectification circuit is electrically connected to the microcontroller U1 and the microcontroller U2; the optical control circuit comprises a microcontroller U5, a switch tube Q13, and a switch tube Q7; the microcontroller U5 is electrically connected to a gate electrode of the switch tube Q13;

the output end of the second power supply circuit is electrically connected to a drain electrode of the switch tube Q13 and a gate electrode of the switch tube Q7;

the dimming interface conversion circuit comprise a dimmer and a microcontroller U4; the output end of the first power supply circuit is electrically connected to the microcontroller U4, the microcontroller U4 is electrically connected a drain electrode of the switch tube Q7 and a positive electrode of the dimmer; a PWM output end of the microcontroller U4 is electrically connected to the microcontroller U1 and the microcontroller U2;

the color temperature adjustment unit comprises a color temperature toggle switch SW2 and two sets of toggle color temperature adjustment circuits that are parallelly connected.

2. The drive circuit for switching color temperature and brightness with a toggle switch according to claim 1, wherein the two sets of toggle color temperature adjustment circuits are a first toggle color temperature adjustment circuit and a second toggle color temperature adjustment circuit, respectively; the first toggle color temperature adjustment circuit comprises a switch tube Q11, a switch tube Q5, and a switch tube Q3, the second toggle color temperature adjustment circuit comprises the switch tube Q12, a switch tube Q6, and a switch tube Q4, the output end of the second power supply circuit is electrically connected to a source electrode of the switch tube Q11 and a source electrode of the switch tube Q12, K1 end of the color temperature toggle switch SW2 is electrically connected to a gate electrode of the switch tube Q11 and a source electrode of the switch tube Q12, a drain electrode of the switch tube Q11 is electrically connected to a gate electrode of the switch tube Q5, a positive electrode of the LED light group is electrically connected to a drain electrode of the switch tube Q5 and a gate electrode of the switch tube Q3, K2 end of the color temperature toggle switch SW2 is electrically connected to a gate electrode of the switch tube Q12 and a source electrode of the switch tube Q11; a drain electrode of the switch tube Q12 is electrically connected to a gate electrode of the switch tube Q6; a positive electrode of the LED light group is electrically connected to a drain electrode of the switch tube Q4.

3. The drive circuit for switching color temperature and brightness with a toggle switch according to claim 2, wherein the LED light group comprises a light group W and a light group C that are parallelly connected, a positive electrode of the light group W and a positive electrode of the light group C are electrically connected to the output end of the rectification circuit, a negative electrode of the light group W is electrically connected to a drain electrode of the switch tube Q3, a negative electrode of the light group C is electrically connected to a drain electrode of the switch tube Q4, a source electrode of the switch tube Q3 is connected to a drain electrode of the switch tube Q1, a source electrode of the switch tube Q4 is connected to a drain electrode of the switch tube Q2.

4. The drive circuit for switching color temperature and brightness with a toggle switch according to claim 1, wherein the first power supply circuit comprises a microcontroller U3, an output end of the rectification circuit is electrically connected to the microcontroller U3, the microcontroller U3 outputs a 12V output voltage, the 12V output voltage supplies power to the microcontroller U4.

5. The drive circuit for switching color temperature and brightness with a toggle switch according to claim 4, wherein the second power supply circuit comprises a filtering capacitor EC7, a resistor R30, a capacitor C5, and a voltage regulator diode that are paralleling connected; the second power supply circuit converts the 12V output voltage to a 5V output voltage, the 5V output voltage supplies power to the microcontroller U5.

6. The drive circuit for switching color temperature and brightness with a toggle switch according to claim 1, wherein the rectification circuit comprises a rectification bridge and a filtering capacitor, the rectification bridge is electrically connected to the filtering capacitor.

* * * * *